UNITED STATES PATENT OFFICE.

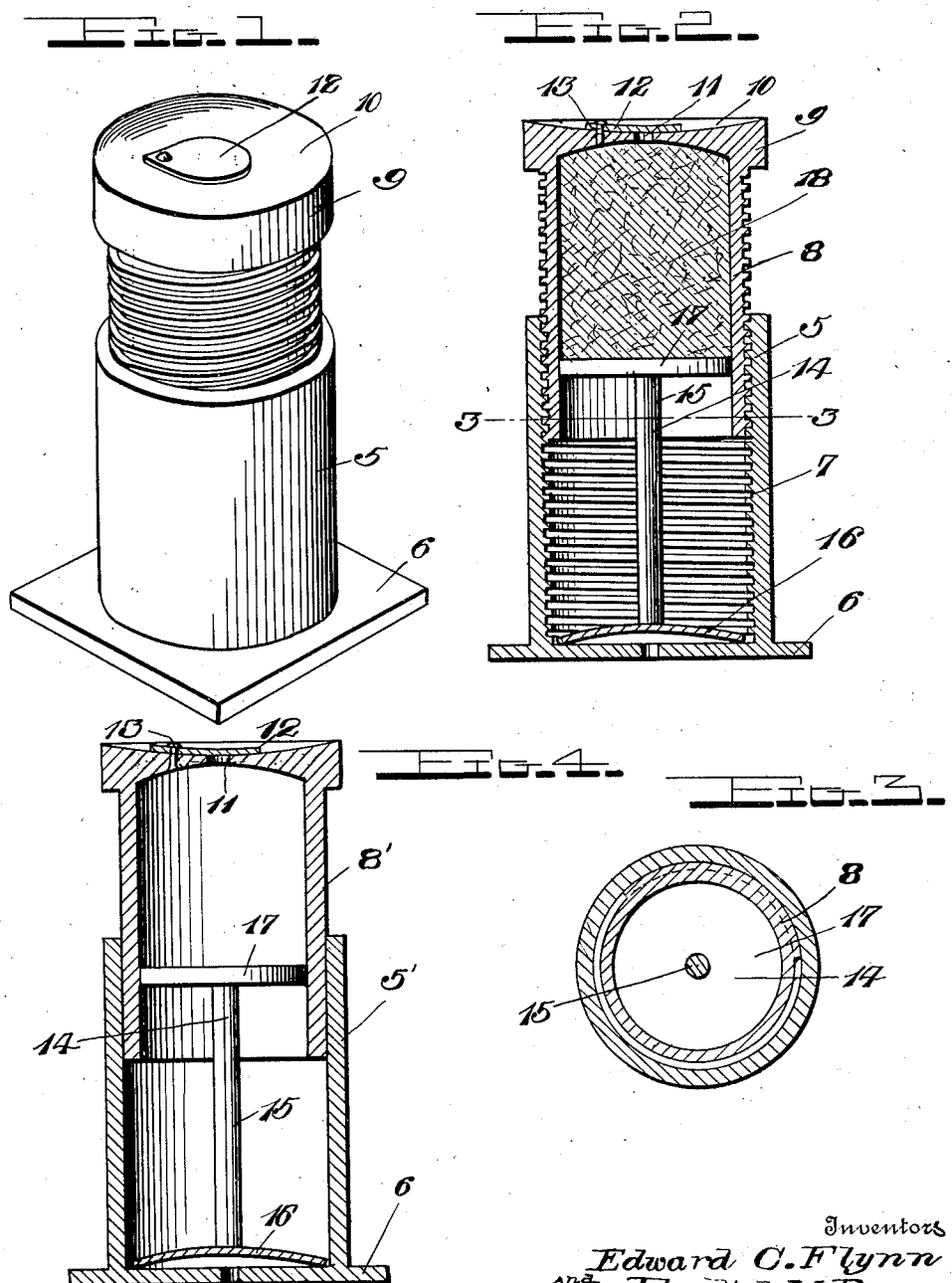

EDWARD C. FLYNN AND FREDICK W. PAYNE, OF BINGHAMTON, NEW YORK, ASSIGNORS, BY DIRECT AND MESNE ASSIGNMENTS, OF ONE-HALF TO SAID FLYNN AND ONE-HALF TO ROBERT STEPHENSON, OF BINGHAMTON, NEW YORK.

PASTE-CUP.

1,055,028.

Specification of Letters Patent. Patented Mar. 4, 1913.

Application filed December 16, 1911. Serial No. 666,257.

*To all whom it may concern:*

Be it known that we, EDWARD C. FLYNN and FREDICK W. PAYNE, citizens of the United States, residing at Binghamton, in the county of Broome and State of New York, have invented certain new and useful Improvements in Paste-Cups, of which the following is a specification, reference being had to the accompanying drawings.

This invention relates to certain new and useful improvements in paste cups of that character used by cigar manufacturers for pasting the edges of the cigar wrapper around the body of the filler.

Another object of the invention is to provide a device of the above character which will be absolutely sanitary in use, and whereby considerable economy in the consumption of paste is effected.

Still another object of the invention is to provide an improved paste cup consisting of a body member, a movable cylinder arranged within the body member to contain the paste and having an outlet aperture in one end, and a plunger arranged within the body and the cylinder to force the paste through said aperture in the movement of the cylinder.

A still further object of the invention is to provide a device of the above character which is neat in appearance, strong and durable in construction and will efficiently perform the function for which the same is devised.

With the above and other objects in view, the invention consists of the novel features of construction, combination and arrangement of parts hereinafter fully described and claimed, and illustrated in the accompanying drawings, in which—

Figure 1 is a perspective view of a paste cup constructed in accordance with the present invention; Fig. 2 is a longitudinal section thereof; Fig. 3 is a section taken on the line 3—3 of Fig. 2; and Fig. 4 is a view similar to Fig. 2 illustrating a slightly modified form of the invention.

Referring in detail to the drawing 5 designates a cylindrical body member which is provided upon one end with a supporting base plate 6. This body member is further provided with internal screw threads 7 to receive the external threads upon the wall of the movable cylinder 8. This cylinder is closed at one end by the head 9 which is provided with a concave face 10 and has a central aperture 11. A closure plate 12 is pivoted at one end to the concave face of the head 9 as indicated at 13 and is adapted to be moved over said aperture when the device is not in use to close the same. A plunger 14 is arranged within the body 5 and the cylinder 8 and consists of a rod or stem 15 having a circular plate or disk 16 on one of its ends and a presser head 17 on the other end thereof. Within the movable cylinder 8 and between the closed end thereof and the presser head 17 the paste 18 is placed.

The operation of the device is as follows. The outlet aperture 11 in the end of the cylinder 8 is closed by moving the plate 12 over the same and the paste is supplied to said cylinder through the open end thereof. The head 17 of the plunger is now inserted in the cylinder 8 upon the body of the paste and the plate 16 on the other end of the plunger rod or stem is disposed within the body 5 and rests upon the bottom or base 6 thereof. The threads of the cylinder 8 are now engaged with the interior threads on the body and the device is in condition for use. After moving the plate 12 from its position over the aperture 11, it will be obvious that upon screwing the cylinder 8 downwardly within the body, the head of the plunger will act to force the paste upwardly through the outlet aperture and discharge the paste upon the concave upper face of the head of the cylinder 8. In this manner the operator can at all times have any desired quantity of the paste upon the top of the cylinder 8 and only a comparatively small portion of the paste is exposed. By means of our device it will be seen that the paste is kept at all times in a perfectly sanitary condition and as it is completely housed when not in use, it will not dry up or evaporate whereby considerable economy is effected.

In Fig. 4 of the drawings we have illustrated a slightly modified form of the device wherein the cylinder 8' is frictionally mounted within the body 5' and is simply forced downwardly within said body to cause the plunger to express the paste through the aperture in the top of the cylinder.

By means of our improved paste cup constructed in the manner above described, it will be observed that when the paste in the cylinder has become almost exhausted, and the same is to be replenished, the new paste is placed upon the top of that remaining in the cylinder so that the remaining portion of the first supply will be first discharged from the top of the cylinder and used, in the continued operation of the device. It will thus be seen that no old paste remains for any great length of time within the cup. Our improved sanitary paste cup also greatly facilitates the application of the paste to the tobacco wrapper of cigars and eliminates waste. The device is neat in appearance, strong and durable in construction and admirably adapted for the purposes in view. While the device is preferably constructed of brass or other metal, it will be understood that the same can be also manufactured of glass or any other desired material. The invention is susceptible of a great many other minor modifications in the form, proportion and arrangement of the parts without departing from the essential feature or sacrificing any of the advantages thereof.

Having thus described the invention what is claimed is:—

A device of the character described comprising a tubular body having a base plate formed on one end and provided with interior screw threads; a paste containing cylinder having screw threads adapted to engage the threads on the body and longitudinally movable within said body, a head formed on one end of said cylinder, having a concave upper face and a central outlet opening for the paste, a closure plate pivoted upon the concave face of said head and movable over the opening to close the same, and a stationary plunger having a spring plate secured to one of its ends and having a presser head secured to its other end to engage the paste and force the same through the outlet opening upon the concave face of the cylinder head in the movement of said cylinder within the body.

In testimony whereof we hereunto affix our signatures in the presence of two witnesses.

EDWARD C. FLYNN.
FREDICK W. PAYNE.

Witnesses:
EDMUND B. JENKS,
FREDERICK J. MEAGHER.